United States Patent
Park

(10) Patent No.: US 9,332,374 B2
(45) Date of Patent: May 3, 2016

(54) COMMUNICATION INTERFACE METHOD FOR SE EQUIPPED ON MOBILE TERMINAL AND SE USING THE SAME

(71) Applicant: SK C&C CO., LTD., Seongnam-si, Gyeonggi-do (KR)

(72) Inventor: Ji Hyun Park, Seoul (KR)

(73) Assignee: SK HOLDINGS CO., LTD., Seoul (KR)

( * ) Notice: Subject to any disclaimer, the term of this patent is extended or adjusted under 35 U.S.C. 154(b) by 47 days.

(21) Appl. No.: 14/354,786

(22) PCT Filed: Oct. 26, 2012

(86) PCT No.: PCT/KR2012/008866
§ 371 (c)(1),
(2) Date: Apr. 28, 2014

(87) PCT Pub. No.: WO2013/062358
PCT Pub. Date: May 2, 2013

(65) Prior Publication Data
US 2014/0315600 A1 Oct. 23, 2014

(30) Foreign Application Priority Data
Oct. 28, 2011 (KR) .................. 10-2011-0111240

(51) Int. Cl.
| | |
|---|---|
| *H04M 1/00* | (2006.01) |
| *H04W 4/00* | (2009.01) |
| *G06F 13/14* | (2006.01) |
| *G06F 9/00* | (2006.01) |
| *H04L 12/24* | (2006.01) |
| *G06F 9/54* | (2006.01) |
| *H04W 12/08* | (2009.01) |
| *H04L 29/06* | (2006.01) |
| *H04W 4/14* | (2009.01) |

(52) U.S. Cl.
CPC ............. *H04W 4/003* (2013.01); *G06F 9/00* (2013.01); *G06F 9/54* (2013.01); *G06F 13/14* (2013.01); *H04L 41/026* (2013.01); *H04W 4/001* (2013.01); *H04W 12/08* (2013.01); *H04L 63/0281* (2013.01); *H04L 69/16* (2013.01); *H04W 4/14* (2013.01)

(58) Field of Classification Search
CPC ........................................ H04W 4/003
USPC ........................................ 455/558
See application file for complete search history.

(56) References Cited

U.S. PATENT DOCUMENTS 8,814,051 B2 * 8/2014 Millet et al. ............... 235/492
2011/0047053 A1 2/2011 Kim et al.

FOREIGN PATENT DOCUMENTS

| EP | 1 452 964 A1 | 9/2004 |
|---|---|---|
| EP | 1 965 596 A1 | 9/2008 |
| EP | 2 182 439 A1 | 5/2010 |

OTHER PUBLICATIONS

European Search Report for corresponding Application No. 12843526.0 issued Jun. 9, 2015.

*Primary Examiner* — Sanh Phu
(74) *Attorney, Agent, or Firm* — Sughrue Mion, PLLC

(57) ABSTRACT

A communication interface method for an SE equipped on a mobile terminal and an SE using the same are provided. The communication interface method includes: connecting, by a communication manager installed in an SE equipped on a mobile terminal, to a server via the mobile terminal; and executing, by the communication manager, communication processes between an applet which is installed in the SE separately from the communication manager, and the server. Accordingly, since the communication processes between the applet and the server are executed by the separate communication manager other than the applet, the processing function is omitted from the applets so that the applets can be simplified.

11 Claims, 7 Drawing Sheets

|  | OTA | TCP | UDP |
|---|---|---|---|
| TOOLKIT APPLET-1 | O | O | O |
| TOOLKIT APPLET-2 | O | O | O |
| TOOLKIT APPLET-3 | O | O | O |

COMMUNICATION INTERFACE METHOD FOR SE EQUIPPED ON MOBILE TERMINAL AND SE USING THE SAME

CROSS REFERENCE TO RELATED APPLICATIONS

This is a National Stage of International Application No. PCT/KR2012/008866 filed Oct. 26, 2012, claiming priority based on Korean Patent Application No. 10-2011-0111240 filed Oct. 28, 2011, the contents of all of which are incorporated herein by reference in their entirety.

TECHNICAL FIELD

The present invention relates to a communication interface method, and more particularly, to a communication interface method for a Secure Element (SE) equipped on a mobile terminal.

BACKGROUND ART

A toolkit applet executed in a Universal Subscriber Identity Module (USIM) card is equipped with a communication processing function to perform Over The Air (OTA) communication or Bearer Independent Protocol (BIP)/Transmission Control Protocol (TCP)/User Datagram Protocol (UDP) communication with a mobile network operator server.

FIG. 1 is a view illustrating a program architecture of the USIM card. As shown in FIG. 1, the USIM card includes a plurality of toolkit applets 11, 12, and 13 installed therein to perform different services, in addition to a toolkit framework 20 and a Card Operating System (COS) 30.

The toolkit applets 11, 12, and 13 are equipped with their respective communication processing functions to perform necessary communication processes directly.

FIG. 2 is a table showing communication schemes of the toolkit applets 11, 12, and 13. Referring to FIGS. 1 and 2, 1) the toolkit applet-1 11 executes communication processes only according to OTA, 2) the toolkit applet-2 12 executes communication processes only according to OTA and TCP, and 3) the toolkit applet-3 13 executes communication processes only according to TCP and UDP.

In order for the toolkit applet-1 11 to execute communication processes according to TCP, TCP communication processing function should be added to the toolkit applet-1 11, which may cause inconvenience in programming.

In addition, addition of the communication processing function to the toolkit applets 11, 12, and 13 makes it difficult to develop toolkit applets. In addition, since the toolkit applets 11, 12, and 13 are equipped with overlapping communication processing functions, the capacity of the applet increases and thus a high capacity memory is required.

With the recent development of the mobile network and the advent of various mobile services, the communication between the server and the USIM card is becoming more frequent and the amount of data exchanged therebetween is increasing. Therefore, the number of toolkit applets requiring BIP communication in addition to OTA communication is increasing.

In this situation, since the capacity of the toolkit applet increases and the demand for a high-capacity memory increase, it is difficult to develop the toolkit applets and the manufacturing cost of the USIM card increases.

DISCLOSURE

Technical Problem

One or more exemplary embodiments provide a communication interface method which executes communication processes between an applet and a server by means of a communication manager which is separate from an applet, and an SE using the same.

Technical Solution

According to an aspect of an exemplary embodiment, there is provided a communication interface method including: connecting, by a communication manager installed in an SE equipped on a mobile terminal, to a server via the mobile terminal; and executing, by the communication manager, communication processes between an applet which is installed in the SE separately from the communication manager, and the server.

The executing may include executing the communication processes between the applet and the server with respect to only an applet which is registered to communicate with the server by means of the communication manager.

An applet which is not registered to communicate with the server by means of the communication manager may directly execute the communication processes for the server.

The executing may include executing the connection processes between the applet and the server.

The executing may include: extracting a command from data received from the server; transmitting the command to the applet; generating a command response based on a result of processing of the command received from the applet; and transmitting the command response to the server.

A communication between the applet and the server may be a communication via OTA, BIP, TCP, or UDP.

According to an aspect of another exemplary embodiment, there is provided an SE including: an interface configured to connect to a mobile terminal; a memory in which an applet and a communication manager are separately installed; and a processor configured to execute the communication manager to connect to a server via the mobile terminal connected to the interface, and configured to execute communication processes between the applet and the server by means of the communication manager.

According to an aspect of another exemplary embodiment, there is provided a computer-readable recording medium on which a communication manager installed in an SE equipped on a mobile terminal is recorded, the communication manager performing a communication interface method including: connecting to a server via the mobile terminal; executing communication processes between an applet which is installed in the SE separately from the communication manager, and the server.

Advantageous Effects

According to the exemplary embodiments as described above, the communication processes between the applet and the server are executed by the separate communication manager other than the applet. Therefore, the communication processing function is omitted from the applets so that the applets can be simplified. Accordingly, the capacity of the applet can be reduced and the SE can be implemented by using a small capacity memory.

In addition, since the communication processing function is omitted from the applets, the development of the applets can be simplified. In addition, a new communication scheme can be added simply by updating the communication manager without updating the already installed applets. Therefore, the functions can be expanded more easily.

BEST MODE

Figures 1, 2:
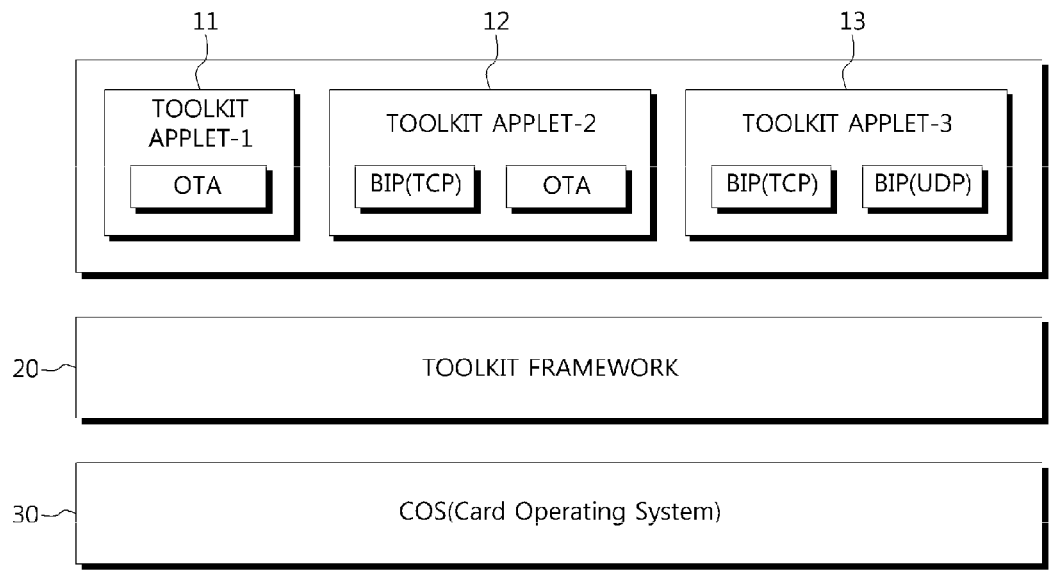
FIG. 1 is a view illustrating a program architecture of a USIM card.
FIG. 2 is a view illustrating communication schemes of the toolkit applets of FIG. 1.

Reference will now be made in detail to the embodiment of the present general inventive concept, examples of which are illustrated in the accompanying drawings, wherein like reference numerals refer to the like elements throughout. The embodiment is described below in order to explain the present general inventive concept by referring to the drawings.

Figure 3:
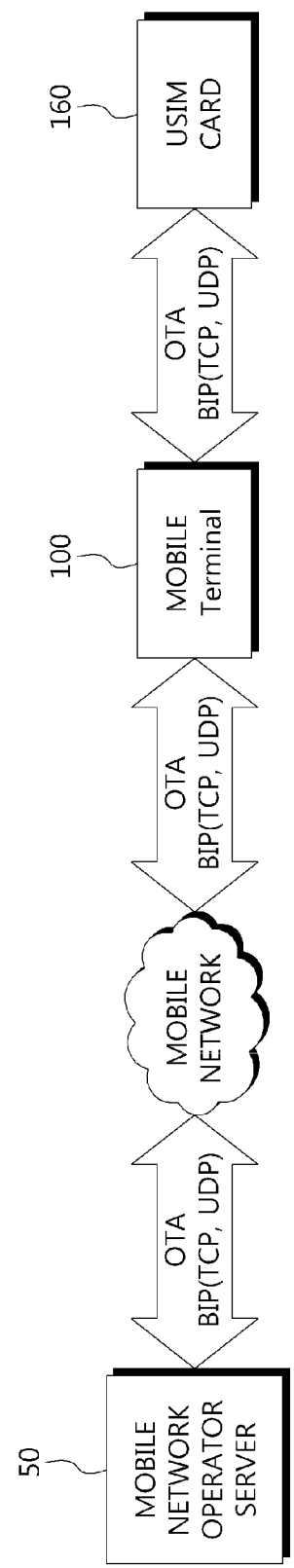
FIG. 3 is a view illustrating a communication system to which the present invention is applicable.

FIG. 3 is a view illustrating a communication system to which the present invention is applicable. As shown in FIG. 3, the communication system to which the present invention is applicable is established by connecting a mobile network operator server 50, a mobile terminal 100, and a USIM card 160 to one another.

Specifically, the mobile terminal 100 and the mobile network operator server 50 are connected with each other via a mobile network to communicate using OTA or BIP methods. For BIP method, it's inclusive of TCP and UDP methods.

The USIM card 160 can be equipped on the mobile terminal 100. When the USIM card 160 is equipped on the mobile terminal 100, the USIM card 160 and the mobile terminal 100 are communicable with each other. The mobile terminal 100 and the USIM card 160 may communicate with each other according to OTA or BIP.

When the communication is performed according to OTA, data is transmitted in the form of a Short Message Service (SMS) message, and, when the communication is performed according to BIP (TCP or UDP), data is transmitted in the form of a packet.

Figure 4:
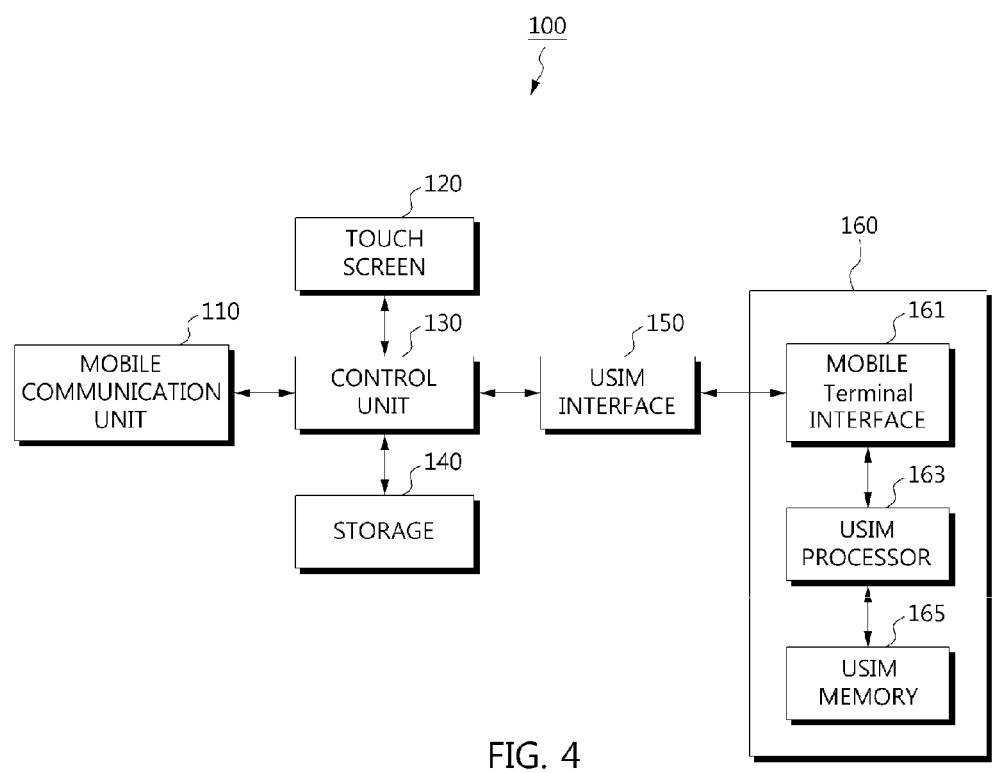
FIG. 4 is a block diagram illustrating a mobile terminal on which a USIM card is equipped.

FIG. 4 is a block diagram illustrating the mobile terminal 100 on which the USIM card 160 is equipped. As shown in FIG. 4, the mobile terminal 100 includes a mobile communication unit 110, a touch screen 120, a control unit 130, a storage 140, and a USIM interface 150.

The mobile communication unit 110 is connected with the mobile network operator server 50 via the mobile network, and the USIM interface 150 is a physical communication interface for supporting communication with the USIM card 160.

The touch screen 120 functions as a display to display a user interface (UI) screen and contents, and also, functions as a user interface to receive a user command in a touch manner and transmit the user command to the control unit 130, which will be described in detail below.

The control unit 130 controls an overall operation of the mobile terminal 100 by executing a program stored in the storage 140.

The USIM card 160 equipped on the mobile terminal 100 includes a mobile terminal interface 161, a USIM processor 163, and a USIM memory 165.

The mobile terminal interface 161 is a physical communication interface for supporting communication with the USIM interface 150 of the mobile terminal 100. The USIM memory 165 is a storage medium in which programs and data necessary for the USIM card 160 are stored.

The USIM processor 163 processes a command received from the mobile network operator server 50 via the mobile terminal 100. Prior to processing the command, the USIM processor 163 is connected with the mobile network operator server 50 via the mobile terminal 100.

Figure 5:
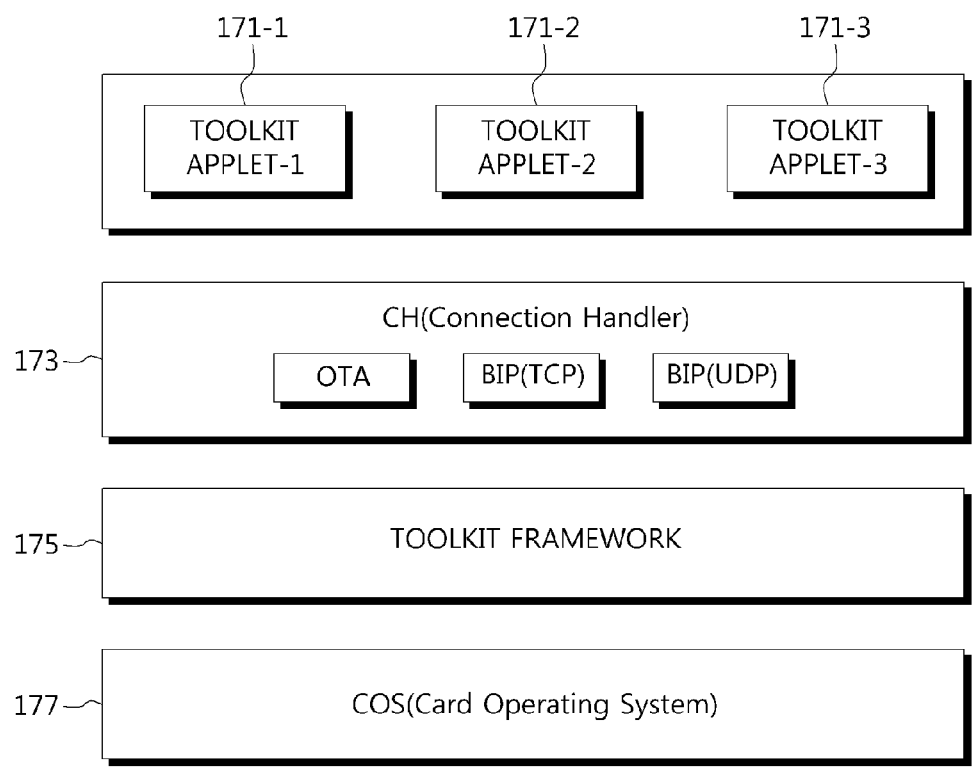
FIG. 5 is a view illustrating a program architecture for a USIM processor to communicate with a server.

FIG. 5 is a view illustrating a program architecture for the USIM processor 163 to communicate with the mobile network operator server 50. The programs of the architecture shown in FIG. 5 are installed in the USIM memory 165 and executed by the USIM processor 163.

As shown in FIG. 5, the program architecture for communicating with the mobile network operator server 50 is established by including toolkit applets 171-1, 171-2, and 171-3, a Connection Handler (CH) 173, a toolkit framework 175, and a Card Operating System (COS) 177.

The COS 177 is an OS for the USIM card 160 and the toolkit framework 175 defines common elements which are shared by the toolkit applets 171-1, 171-2, and 171-3, such as a template, a class, and a library.

As shown in FIG. 5, the plurality of toolkit applets 171-1, 171-2, and 171-3 are installed in the USIM card 160 to perform different services. The toolkit applets 171-1, 171-2, and 171-3 do not execute communication processes for the mobile network operator server 50. That is, the toolkit applets 171-1, 171-2, and 171-3 only process the command.

The communication processes for the mobile network operator server 50 include connecting to the mobile network operator server 50, extracting a command from data received from the mobile network operator server 50, and transmitting a result of processing of the command to the mobile network operator server 50 in response to the command.

The CH 173 is a communication manager for interfacing with the toolkit applets 171-1, 171-2, and 171-3 and connecting to the mobile network operator server 50 via the mobile terminal 100. In addition, the CH 173 may be regarded as a framework for executing communication processes between the toolkit applets 171-1, 171-2, and 171-3 and the mobile network operator server 50.

That is, the CH 173 connects the mobile network operator server 50 and the USIM card 160, and extracts a command from the data received from the mobile network operator server 50, transmits the command to a corresponding applet, and transmits a result of processing the command of the applet to the mobile network operator server 50 in response to the command.

Herein, the communication with the mobile network operator server 50 includes communication according to OTA and communication according to BIP (TCP or UDP).

Figures 6, 7:
FIG. 6 is a table illustrating communication schemes of the toolkit applets of FIG. 5.
FIG. 7 is a view illustrating a format of an Elementary File (EF)

Accordingly, OTA and BIP (TCP and UDP) can be applied to all of the toolkit applets 171-1, 171-2, and 171-3 as shown in FIG. 6.

From among the toolkit applets installed in the USIM card 160, there may be a toolkit applet which does not require communication processes by the CH 173 or does not want the communication processes by the CH 173.

This is managed by an Elementary File (EF). Specifically, Toolkit Applet References (TARs) of the toolkit applets which will execute the communication processes by means of the CH 173 may be registered at and managed by the EF.

FIG. 7 illustrates a format of the EF. As shown in FIG. 7, the number of registered TARs and the TARs may be recorded on the EF.

Specifically, information on the number of TARs registered at the EF is recorded. In addition, the TARs of the toolkit applets which will execute the communication process by means of the CH 173 are recorded.

It is assumed that the TAR-1 of the toolkit applet-1 171-1 and the TAR-2 of the toolkit applet-2 171-2 are recorded on the EF, whereas the TAR-3 of the toolkit applet-3 171-3 is not recorded on the EF.

In this case, with respect to the toolkit applets-1 171-1 and the toolkit applet-2 171-2, the CH 173 executes the communication processes for the mobile network operator server 50.

With respect to the toolkit applet-3 171-3, however, the CH 173 does not execute the communication processes for the mobile network operator server 50, and the toolkit applet-3 171-3 executes the communication processes directly. Accordingly, in this case, the toolkit applet-3 171-3 is required to include functions of executing the communication processes.

Figure 8:
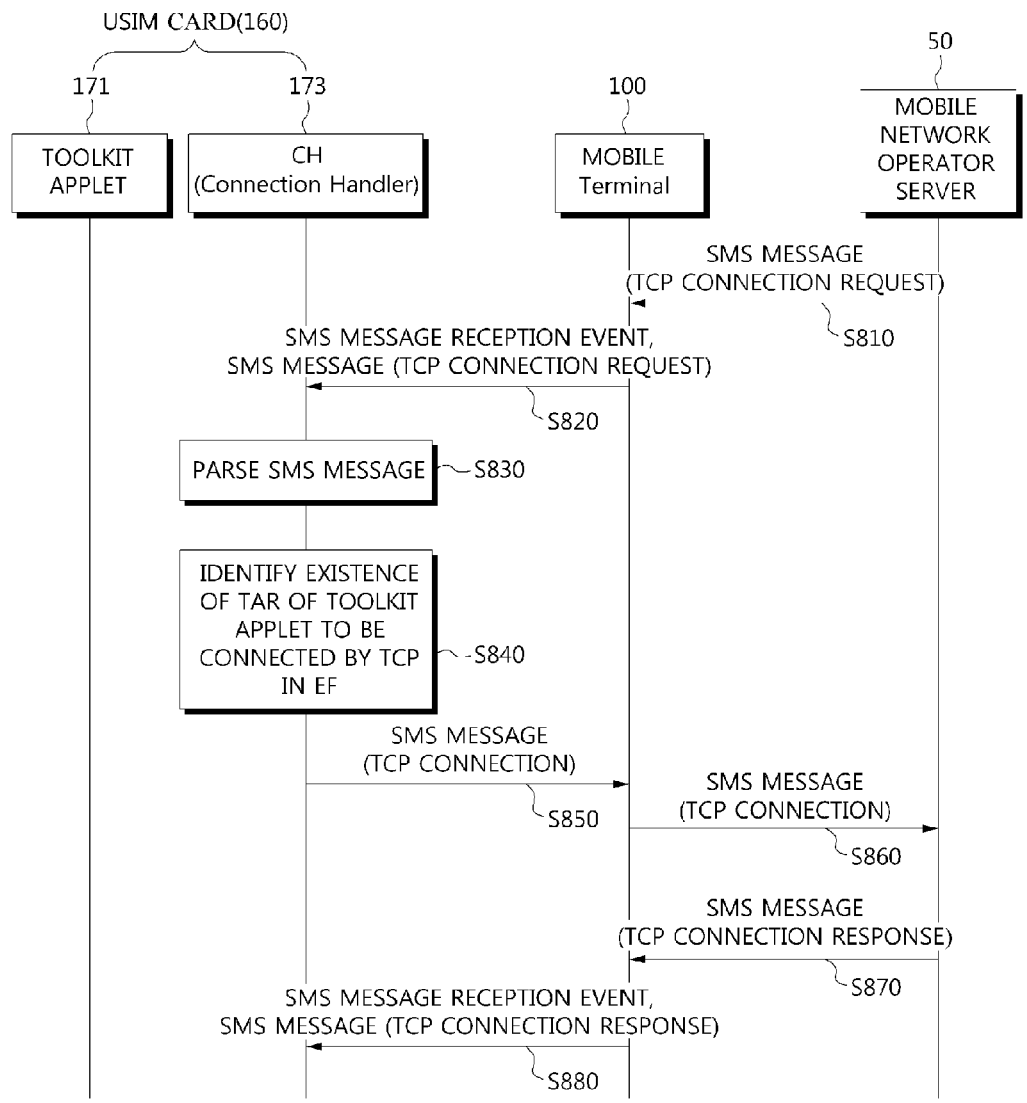
FIG. 8 is a view to illustrate a process of connecting a mobile network operator server and a USIM card.

Hereinafter, a communication interface method of the system of FIG. 3 will be explained with reference to FIGS. 8 and 9. FIG. 8 is a view to illustrate a process for connecting the mobile network operator server 50 and the USIM card 160, and FIG. 9 is a view illustrating a process for communicating between the mobile network operator server 50 and the USIM card 160

Figure 9:
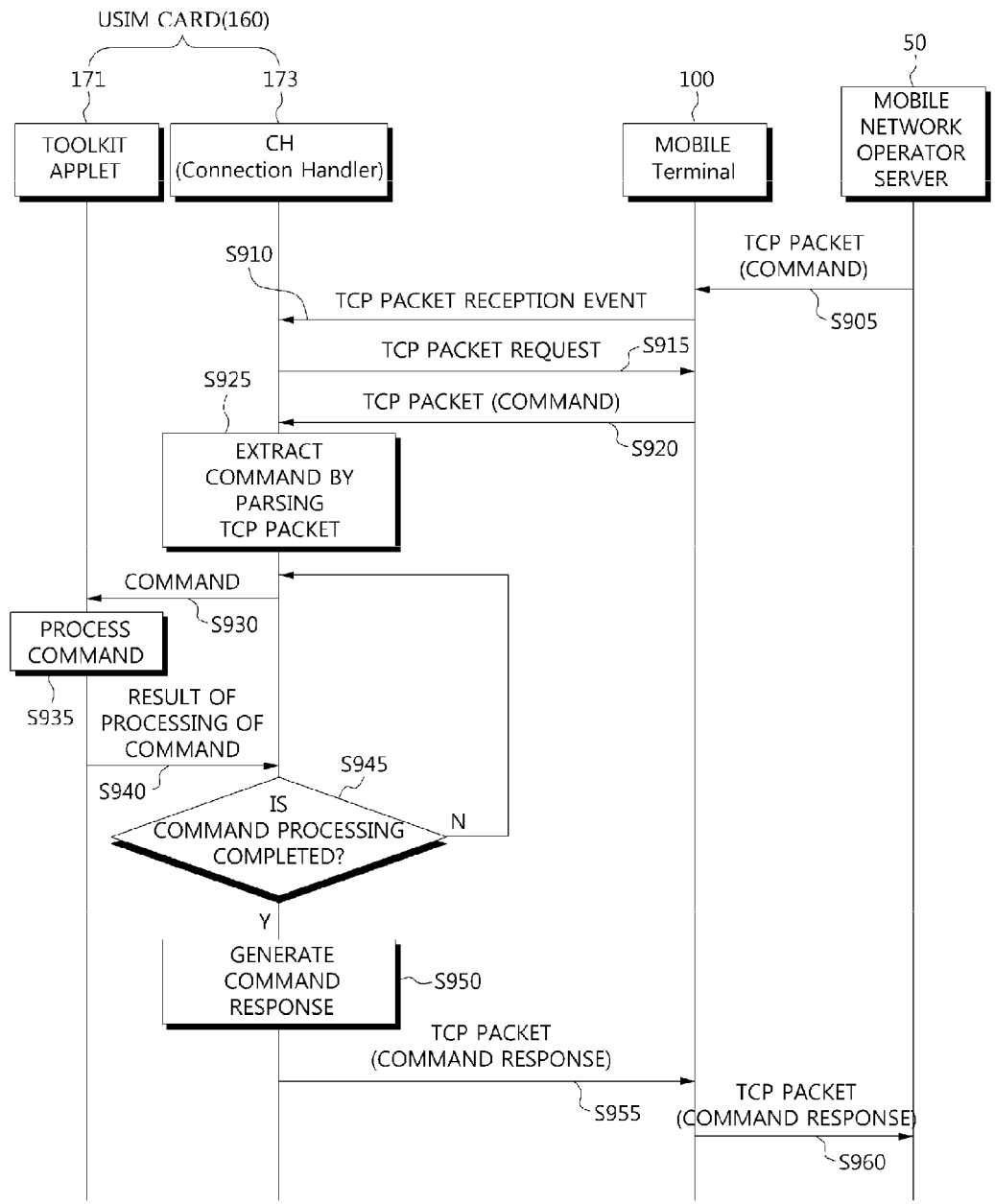
FIG. 9 is a view illustrating a process of communicating between a mobile network operator server and a USIM card.

It is assumed that the toolkit applet 171 shown in FIGS. 8 and 9 has its TAR registered at the EF. That is, the toolkit applet 171 executes the communication processes for the mobile network operator server 50 by means of the CH 173.

As shown in FIG. 8, when an SMS message containing TCP connection request is received from the mobile network operator server 50 (S810), the mobile terminal 100 transmits the SMS message (TCP connection request) received in operation S810 to the CH 173 of the USIM card 160 along with an SMS message reception event (S820).

Since the mobile terminal 100 initially communicates with the mobile network operator server 50 according to OTA, data is transmitted in the form of an SMS message at the early stage of the communication.

Thereafter, the CH 173 identifies "TCP connection request" recorded on the SMS message by parsing the SMS message received in operation S820 (S830), and determines that TAR of the toolkit applet 171 to be connected to the mobile network operator server 50 according to TCP exists in the EF (S840).

When the CH 173 transmits an SMS message (TCP connection) to the mobile terminal 100 (S850), the mobile terminal 100 transmits the SMS message (TCP connection) received in operation S850 to the mobile network operator server 50 (S860).

When the mobile network operator server 50 transmits an SMS message (TCP connection response) to the mobile terminal 100 in response to the SMS message (TCP connection) received in operation S860 (S870), the mobile terminal 100 transmits the SMS message (TCP connection response) received in operation S870 to the CH 173 of the USIM card 160 along with an SMS message reception event (S880).

Consequently, TCP connection between the mobile network operator server 50 and the USIM card 160 is completed. TCP connection between the mobile network operator server 50 and the USIM card 160 is performed by the CH 173 of the USIM card 160 and does not involve the toolkit applet 171.

This is because the toolkit applet 171 shown in FIG. 8 is set to have its TAR registered at the EF. That is, the toolkit applet 171 is set to execute the communication processes for the mobile network operator server 50 by means of the CH 173.

Therefore, when the TAR of the toolkit applet 171 shown in FIG. 8 is not registered at the EF (when the CH 173 does not execute the communication processes for the mobile network operator server 50), TCP connection is performed by the toolkit applet 171 rather than the CH 173.

Hereinafter, TCP communication process performed between the mobile network operator server 50 and the USIM card 160 after TCP connection is established between the mobile network operator server 50 and the USIM card 160 as shown in FIG. 8 will be explained with reference to FIG. 9.

Referring to FIG. 9, when receiving TCP packet recording a command from the mobile network operator server 50 after TCP connection is completed (S905), the mobile terminal 100 transmits TCP packet reception event to the CH 173 of the USIM card 160 (S910).

When the CH 173 requests TCP packet from the mobile terminal 100 in response to TCP packet reception event received in operation S910 (S915), the mobile terminal 100 transmits TCP packet (command) to the CH 173 (S920).

Thereafter, the CH 173 extracts the command from TCP packet by parsing TCP packet received in operation S920 (S925), and transmits the command to the toolkit applet 171 (S930).

The toolkit applet 171 processes the command received in operation S930 (S935), and transmits a result of the processing of the command in operation S935 to the CH 173 (S940).

When the processing of the command is completed by the toolkit applet 171 (S945-Y), the CH 173 generates a command response on which the results of the processing of the command are recorded (S950), and transmits the command response to the mobile terminal 100 (S955).

The mobile terminal 100 transmits TCP packet (command response) received in operation S955 to the mobile network operator server 50 (S960).

Up to now, the method for connecting the mobile network operator server 50 and the USIM card 160 by means of the CH 173, and the method for communicating data according to the exemplary embodiment have been described.

In the above-described exemplary embodiment, the three toolkit applets are installed in the USIM card 160. However, this is merely an example. The present application can apply when four or more toolkit applets or fewer than 2 toolkit applets may be installed in the USIM card 160.

In addition, in the above-described exemplary embodiment, the mobile network operator server 50 and the USIM card 160 establish TCP connection. However, this is merely an example. The present invention can apply when the mobile network operator server 50 and the USIM card 160 establish UDP connection, OTA connection or any other types of connection.

In addition, the USIM card 160 is an example of an SE which communicates with the mobile network operator server 50 for the purpose of providing services to the user of the mobile terminal 100. However, the present invention can apply when the USIM card is substituted with other kinds of SEs (for example, an embedded SE, a Secure Memory Card, etc.)

In addition, the present invention can apply when applets other than the toolkit applet are used, and the present invention can apply when the USIM card 160 communicates with servers other than the mobile network operator server 50.

The mobile terminal 100 and the mobile network operator server 50 may be connected with each other via a wireless network rather than the mobile network, and the present invention can apply when the mobile terminal 100 is substituted with other types of mobile devices.

The technical idea of the present invention can apply to a computer-readable recording medium which records a computer program for performing the functions of the apparatus and method according to the exemplary embodiment. In addition, the technical idea of the various exemplary embodiments may be implemented in the form of a computer-readable code that is recorded on a computer-readable recording medium. Any data storage device that can be read by a computer and can store data may be used as the computer-readable recording medium. For example, the computer-readable recording medium may be a Read Only Memory (ROM), a Random Access Memory (RAM), a CD-ROM, a magnetic tape, a floppy disk, an optical disk, a hard disk drive, etc. In addition, the computer-readable code or program stored in the computer-readable recording medium may be transmitted through a network connected among computers.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

The invention claimed is:

1. A communication interface method comprising:
   connecting, by a communication manager installed in a secure element (SE) equipped on a mobile terminal, to a server via the mobile terminal; and
   executing communication processes between an applet which is installed in the SE separately from the communication manager, and the server,
   wherein the executing comprises:
   determining whether the installed applet is registered to communicate with the server by means of the communication manager,
   if it is determined that the installed applet is registered to communicate with the server by means of the communication manager, executing, by the communication manager, the communication processes between the installed applet and the server, and
   if it is determined that the installed applet is not registered to communicate with the server by means of the communication manager, directly executing, by the installed applet, the communication processes between the installed applet and the server.

2. The communication interface method of claim 1, wherein the executing by the communication server comprises:
   extracting a command from data received from the server;
   transmitting the command to the applet;
   generating a command response based on a result of processing of the command received from the applet; and
   transmitting the command response to the server.

3. The communication interface method of claim 1, wherein a communication between the applet and the server is a communication via OTA, BIP, TCP, or UDP.

4. A secure element (SE) comprising:
   an interface configured to connect to a mobile terminal;
   a memory in which an applet and a communication manager are separately installed; and
   a processor configured to execute the communication manager to connect to a server via the mobile terminal connected to the interface, to determine whether the installed applet is registered to communicate with the server by means of the communication manager, if it is determined that the installed applet is registered to communicate with the server by means of the communication manager, to control the communication manager to execute communication processes between the installed applet and the server, and if it is determined that the installed applet is not registered to communicate with the server by means of the communication manager, to control the installed applet to directly execute the communication processes between the installed applet and the server.

5. A non-transitory computer-readable recording medium on which a computer program enabling a computer to perform a communication interface method is recorded, the communication interface method comprising:
   connecting, by a communication manager installed in a secure element (SE) equipped on a mobile terminal, to a server via the mobile terminal;
   executing communication processes between an applet which is installed in the SE separately from the communication manager, and the server,
   wherein the executing comprises:
   determining whether the installed applet is registered to communicate with the server by means of the communication manager,
   if it is determined that the installed applet is registered to communicate with the server by means of the communication manager, executing, by the communication manager, the communication processes between the installed applet and the server, and
   if it is determined that the installed applet is not registered to communicate with the server by means of the communication manager, directly executing, by the installed applet, the communication processes between the applet the server.

6. The communication interface method of claim 1, wherein the determining whether the applet is registered to communicate with the server by means of the communication manager comprises determining whether a Toolkit Applet Reference (TAR) of the applet is recorded on an Elementary File (EF).

7. The communication interface method of claim 1, wherein a plurality of applets are installed in the SE separately from the communication manager, and the plurality of applets include at least one applet which is registered to communicate with the server by means of the communication manager and at least one applet which is not registered to communicate with the server by means of the communication server.

8. The SE of claim 4, wherein the determining whether the applet is registered to communicate with the server by means of the communication manager comprises determining whether a Toolkit Applet Reference (TAR) of the applet is recorded on an Elementary File (EF).

9. The SE of claim 4, wherein a plurality of applets are installed in the SE separately from the communication manager, and the plurality of applets include at least one applet which is registered to communicate with the server by means of the communication manager and at least one applet which is not registered to communicate with the server by means of the communication server.

10. The non-transitory computer-readable recording medium of claim 5, wherein the determining whether the applet is registered to communicate with the server by means of the communication manager comprises determining whether a Toolkit Applet Reference (TAR) of the applet is recorded on an Elementary File (EF).

11. The non-transitory computer-readable recording medium of claim 5, wherein a plurality of applets are installed in the SE separately from the communication manager, and the plurality of applets include at least one applet which is registered to communicate with the server by means of the communication manager and at least one applet which is not registered to communicate with the server by means of the communication server.

* * * * *